June 16, 1942.   J. T. SCULLY   2,286,443
SHAVING MACHINE
Filed May 16, 1939    5 Sheets-Sheet 1
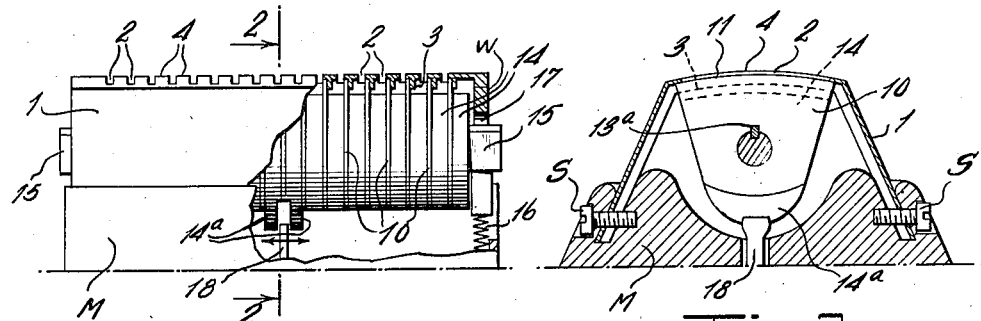
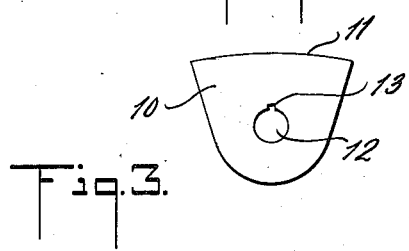
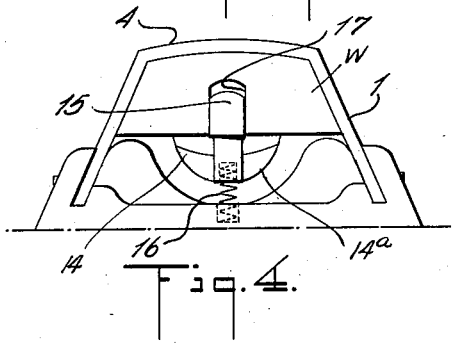
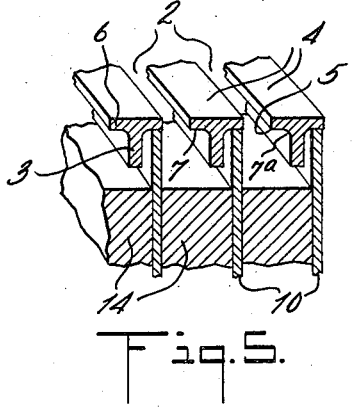
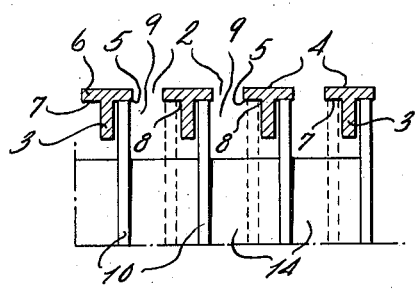
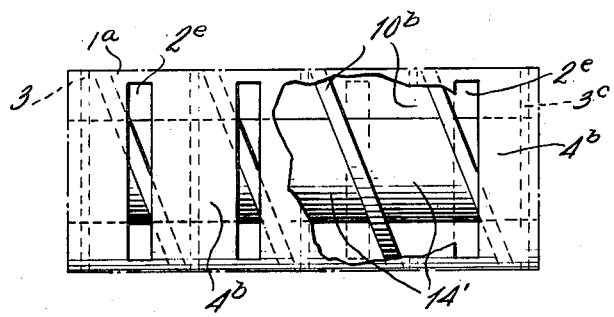
John T. Scully
INVENTOR

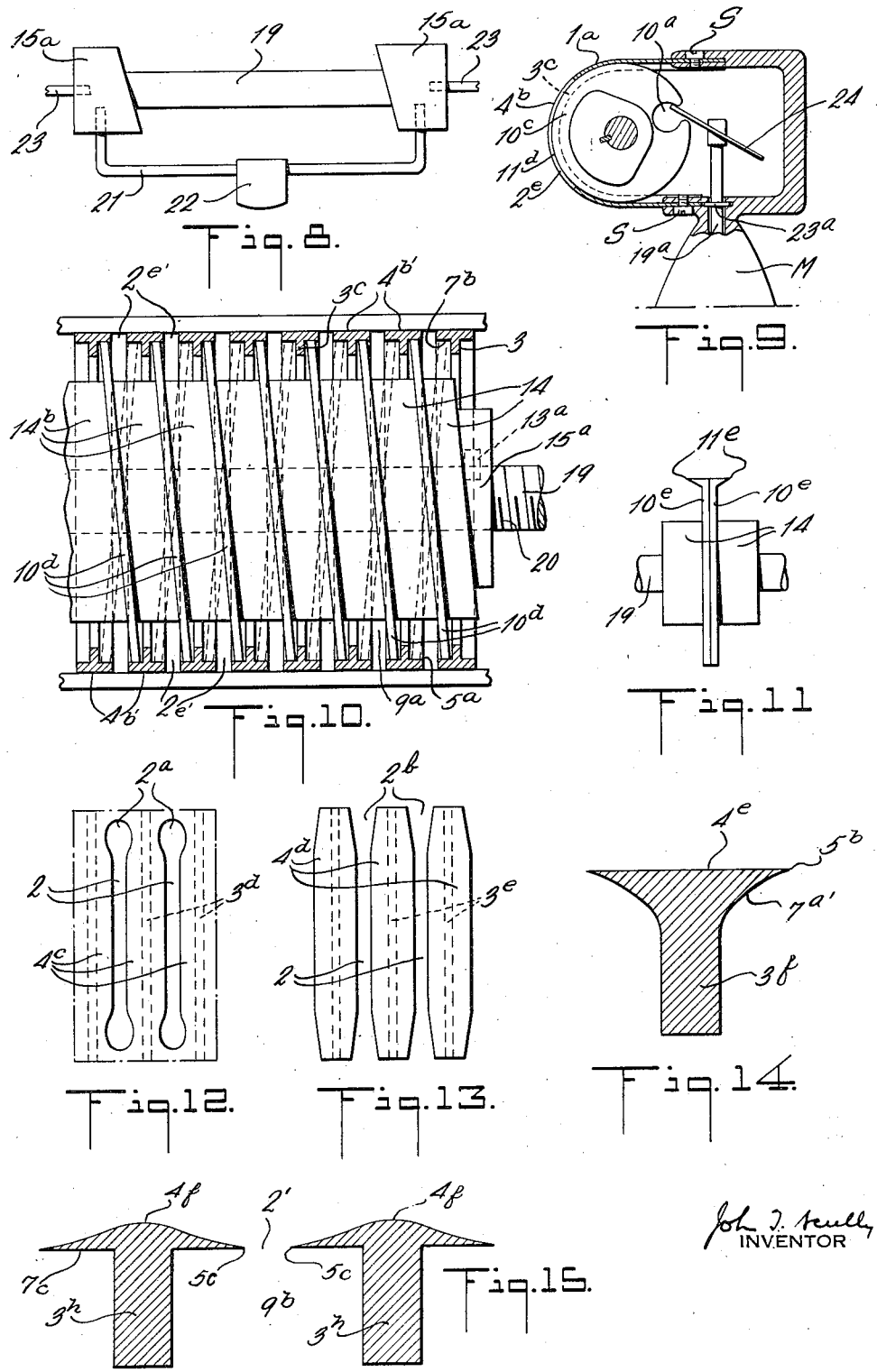

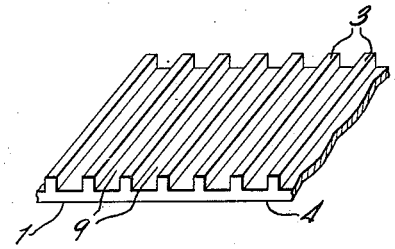
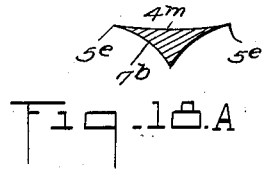
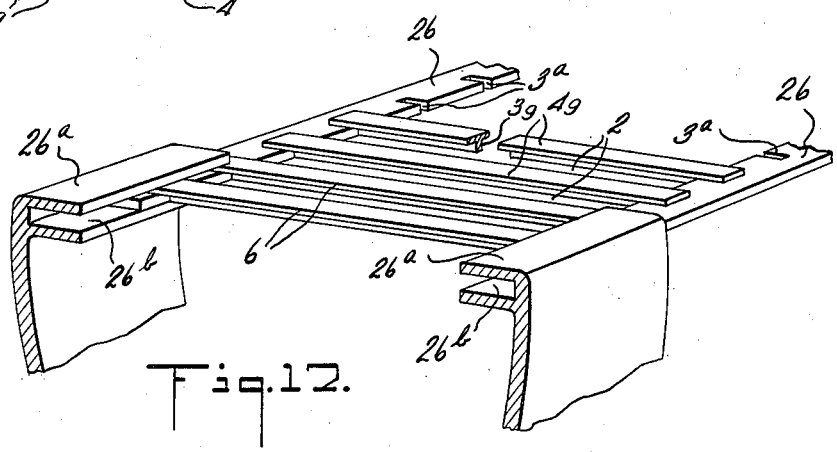
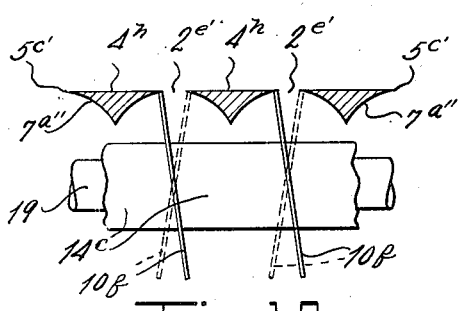
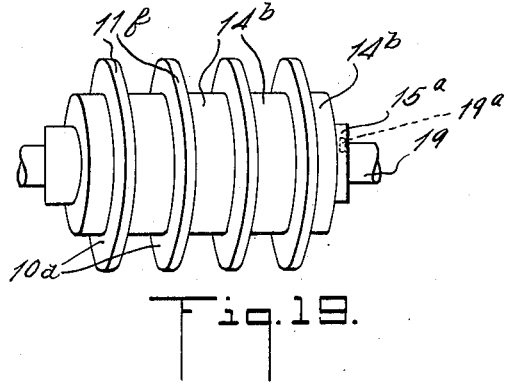
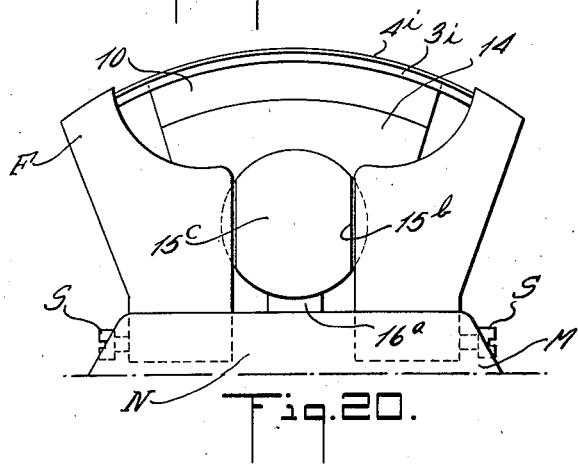
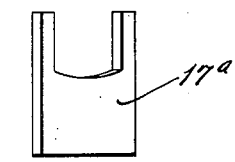

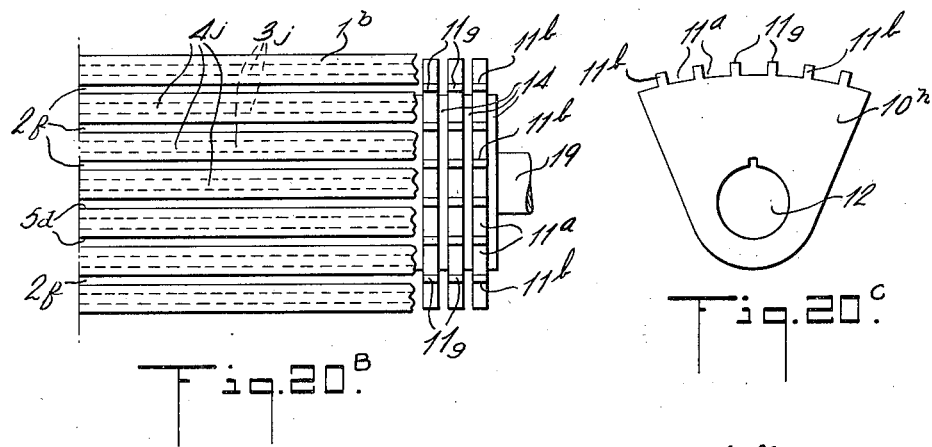
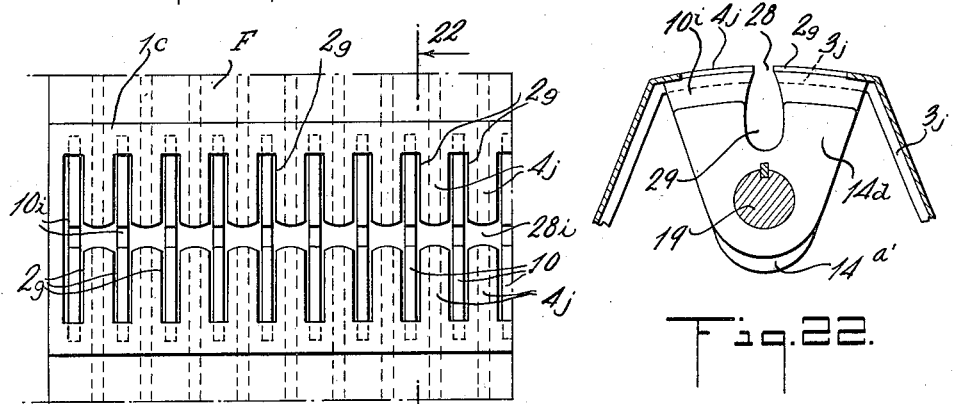
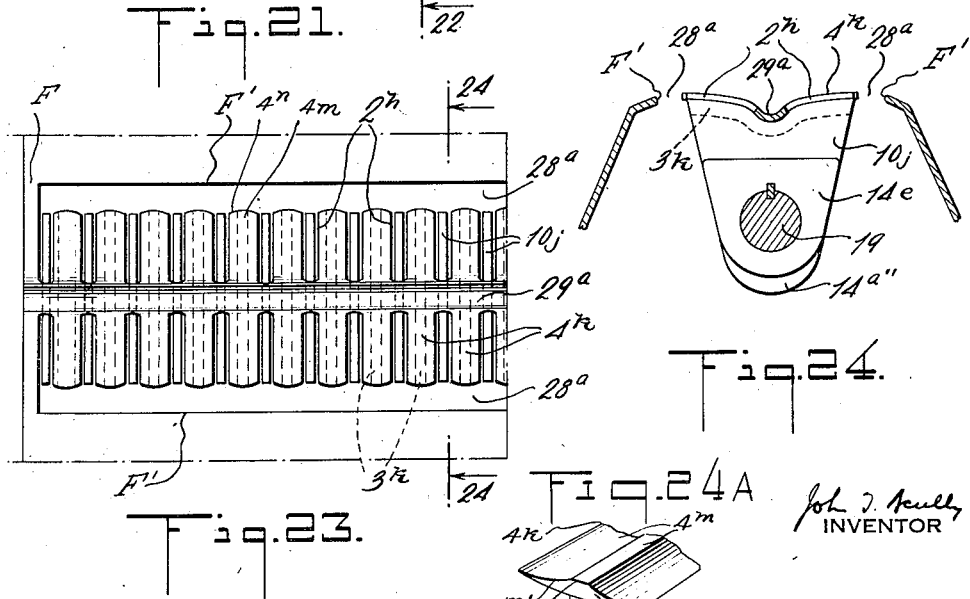

June 16, 1942.   J. T. SCULLY   2,286,443
SHAVING MACHINE
Filed May 16, 1939   5 Sheets-Sheet 5
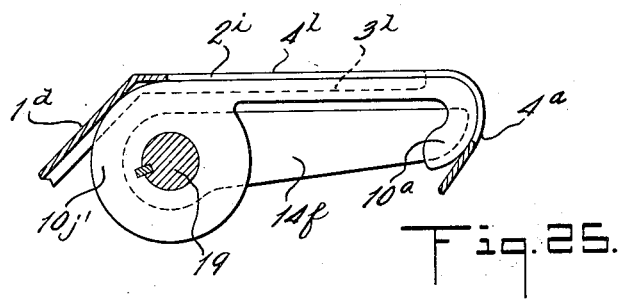
Fig. 25.
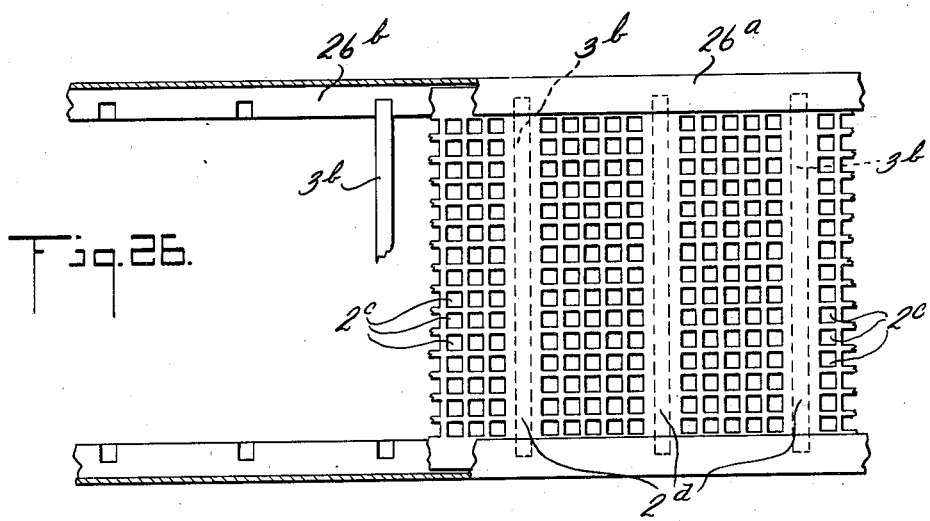
Fig. 26.
Fig. 27.
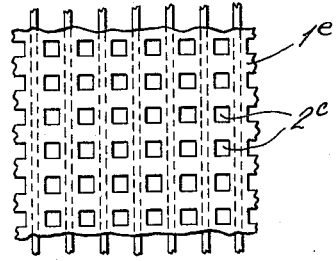
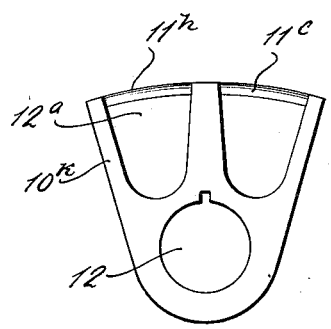
Fig. 28.
John T. Scully
INVENTOR Patented June 16, 1942

2,286,443

UNITED STATES PATENT OFFICE 2,286,443

SHAVING MACHINE

John T. Scully, Lawrence, N. Y.

Application May 16, 1939, Serial No. 273,929

9 Claims. (Cl. 30—43)

This invention relates generally to shaving machines or power-driven hair-implements in which shearing members co-operate to cut the hair and which machines are sometimes referred to as "dry shavers" or "electric razors."

A principal object of the invention is the provision of an improved shear plate or shearing member.

A further principal object is the provision in a shear plate of a relatively large area of extremely thin closely grouped shear edges.

A further object of the invention is the provision of co-operating shearing means for close and rapid shaving.

A further object of the invention is the provision of co-operating shearing members for close and rapid shaving and in which the outer shear plate is reinforced against distortion generally during operation.

A still further object of the invention is the provision of co-operating shear members in which the driven cutter-edges are so disposed as to minimize the tendency of outer thin shear edges to be laterally distorted in the direction of shear cut.

A further object of the invention is to provide an outer shear member reinforced on its inner side by ribs which are close enough together, relative to the thinness of material between the planes of the ribs and in which hair-receiving openings are formed, so as to provide a series of skin-engaging portions which are unyielding to ordinary shaving pressure, and which portions are so close together that the material between the planes of the ribs may be of extreme thinness and not be depressed by ordinary shaving pressure, or by the weight of the instrument on the skin.

A still further object is the provision of an outer shear member having channels formed by reinforcing ribs on its inner side, elongated hair-receiving openings narrower than the channels, and a co-operating cutter member having cutter edges spaced by the ribs.

A still further object is the provision of an outer shear member having a series of channels formed by reinforcing ribs on its inner side, hair-receiving slots extending in the direction in which the ribs extend, and an inner cutter member to co-operate with the outer member to shear-cut in different directions hair which is received in the slots.

Other objects will hereinafter appear and be apparent from the description and the drawings.

My present invention departs from the prior art, as well as in other respects, in providing a shearing plate or shear teeth or shear edges both strong and thin which affords a relatively large area of closely grouped shearing edges, and in which the distance from the skin line to the rear surface, or to the shearing edge, may be four or three one thousandths of an inch or very much less than that, and, which, in fact may be knife edge, or razor edge thickness at the shearing edges while being maintained against lateral or other distortion under operating conditions. The shearing plate may be provided with slots or apertures of various dimensions or shapes and the parts may have any suitable relationship to each other in position and dimension, for example, the width of the slots or other apertures can be closely accommodated to the cross-sectional thickness of the hair to be cut and I provide very thin or sharp edges and effect the desired closeness of cut called for in a shaving machine wherein a primary object is the cutting of hair, without injury to the skin, as near the root as possible and, also, I provide a large area of very thin or sharp shearing edges per given longitudinal length, and in some adaptations a relatively increased area of shearing edge per unit of length of shear plate. When using slots I may use slots with both ends open or one end open, or both ends closed and I may form the hair-receiving slots or apertures in a shearing plate provided with a flat or curved surface, or an irregular surface; the slots or apertures may be of any suitable width and shape, uniform or variable, and in some instances in the case of substantially parallel slots the width of the slot in the shearing zone may be as narrow as six one-thousandths of an inch, and in other instances even narrower; or, again, the width of the slots between their thinnest edge portions may be greater than six one-thousandths of an inch and may, for example, be seven or eight one-thousandths of an inch wide. In order to support a very thin or even a sharp edge defining a hair-receiving aperture or slot and provide an increased area of zone of closest shearing action, I provide the rear surface, or its equivalent of the skin-confronting shearing member, or shear plate, or fingers, or teeth with a support which may or may not be integral with the shear plate. In some embodiments I prefer to have the support integral with the shear plate and in the form of rearwardly extending spaced masses such as ribs or fins, and which ribs or fins normally extend below the plane of the cutter edges on a cutter member which operates behind the skin-confronting shearing member, and I prefer that the ribs or fins extend continuously throughout the shearing zone, but in some instances I may desire to interrupt the continuity of the extending ribs or fins. In other instances I may provide the support for the shearing member shear edges in the form of a separable framework of spaced fins or ribs and against which the shearing plate is held. Preferably the ribs or fins provide a plurality of channels in which the cutters operate and these ribs and channels may extend vertically, horizontally or angularly. The provision of backwardly extending ribs or fins on the rear of the shearing plate and the formation of hair-receiving passages through the front or skin-confronting wall of the shearing member and in a plane other than the plane of the ribs or fins makes possible the safe use of an extremely thin shear plate throughout the area of its shearing zone. The ribs or fins may be formed on a single piece of flat material, flexible or not, by planing out a plurality of channels of which the ribs constitute the side walls and stamping or otherwise cutting suitable apertures or slots in the channel bottom. The side opposite the channel bottom, that is the skin-confronting side may be ground to further decrease the thickness of the walls of the hair-receiving apertures; or the ribs and channels may be formed by a rolling operation, or the shearing member may be built up of a plurality of die drawn rods or wire, or built in the form of a frame. An important purpose of the ribs or fins is to strengthen and support the wall of metal ahead and to maintain the support of the wall or walls ahead when the latter have their thinnest portions extended over a relatively large area of closest shearing zone. This construction when applied to comb teeth or shearing teeth, in single or plural sets of shearing or comb teeth makes possible greatly increasing the length of thinnest or sharpest shear edges on the comb teeth or fingers and at the same time permitting close grouping of shearing edges. Also, the improved shearing member may be adapted to co-operate with various kings of cutter members, for example, cutters formed or cut on a bar, and cutter members may be variously moved to co-operate with the shearing member, that is reciprocated, oscillated or rotated. Rotating cutters formed diagonally on a cylindrical surface such as for example in my Patent Number 1,528,994 of March 10, 1925, or continuous spiral or helical cutters will not co-operate efficiently to produce a close shave unless the channels and ribs extend longitudinally therewith. In the present invention the co-operating cutter member is preferably actuated by an electric motor housed in the handle of the machine as is well known in the art. The cutter member is provided with a plurality of cutter blades having cutting edges on their ends which co-operate with the shear edges in the shear plate and produce a shear-cut. The cutter blades are suitably spaced at their cutting ends so that the projecting masses on the inner side of the shear plate are cleared by the cutting blade edges during operation of the latter. In a preferred form the cutter member includes a plurality of cutting blade edges extending in different planes and in different suitably spaced planes. The cutting edges may be projections on a solid or tubular shaft and be provided on blade ends which are wider or longer, or narrower and longer than hair-receiving openings in the co-operating shear plate. The movable cutter member is actuated at any suitable speed and the speed of cutter travel may be, and in some instances preferably is, related to the relative dimensions of the hair-receiving openings, particularly their width.

The invention is susceptible to a wide variety of relationships as to length, breadth, thickness, shape and materials and the relative proportions of cutter elements, spacing elements, hair-receiving slots or apertures and slot fingers or their equivalents all falling within the scope of this invention.

I wish it to be understood that any or all of the parts may be made of any suitable material or materials and that some or all of the parts may be made of a metal such as steel, or other metals, or alloys thereof; that some or all of the parts, or portions thereof, may be formed of metal having any desirable and suitable composition of ingredients and that such metal may be mechanically worked and or heat treated according to the best practice in the art at any time prevailing, and that such material or metal may be provided with such qualities and degrees of hardness, ductility, strength and corrosion resistance as may be deemed best suited and practicable.

The invention is broad and within its scope are included a wide variety of forms and modifications, a wide variety of relationships in the relative dimensions and positions of inter-related parts, and portions of the shearing members and of the cutters, and a wide variety of combinations of said relative dimensions and positions in the relation they may bear to each other in their co-operative function as a machine.

As illustrative of some forms and modifications of this invention I refer now and in more detail to the drawings in which like characters of reference denote similar or corresponding parts:

Figure 1 is a side elevation partly broken away and with parts enlarged, of an embodiment of the invention.

Figure 2 is a vertical section taken on line 2—2 of Fig. 1.

Figure 3 is a side elevational view of one of the cutter blades.

Figure 4 is an end view of Fig. 1.

Figure 5 is an enlarged fragmentary sectional perspective view of the shear bars and cutter blades.

Figure 6 is an enlarged fragmentary view with the shear bars in section and the cutter blades in elevation showing the path of travel of the latter.

Figure 7 is a fragmentary plan view of a modification of the invention.

Figure 8 is a side elevation of a carrying means for cutter blades.

Figure 9 is a sectional view of a further modification of the invention.

Figure 10 is a fragmentary sectional view through the shear bars with the cutter blades in elevation of a further modification of the invention.

Figure 11 is a side elevation of a modified form of double edged cutter blade.

Figure 12 is a fragmentary top plan view of a shear plate and an enlarged view of hair-receiving openings.

Figure 13 is a fragmentary top plan view of a shear plate and an enlarged view of modified forms of hair-receiving openings.

Figure 14 is an enlarged sectional view of a modified shear bar of an outer shearing member.

Figure 15 is an enlarged sectional view of shear bars with sharpened shear edges.

Figure 16 is a perspective view of a portion of the stock used to make the shear plate in some embodiments.

Figure 17 is an enlarged fragmentary perspective view of a modified construction of an outer shearing member.

Figure 18 is an enlarged fragmentary view with the shear bars in section and cutter blades in elevation of a modification of an embodiment of the invention.

Figure 18A is an enlarged sectional view of a modified construction of the shear bars of Fig. 18.

Figure 19 is a top plan view of a cutter blade assembly.

Figure 20 is an end elevation of a modified form of shaving head.

Figure 20a is a perspective view of a modified form of cutter guide.

Figure 20b is a fragmentary top view of a further embodiment of the invention.

Figure 20c is a side elevational view of a cutter of Fig. 20b.

Figure 21 is a fragmentary top plan view of a modified shaving head.

Figure 22 is a sectional view taken on line 22—22 of Fig. 21.

Figure 23 is a fragmentary top plan view of a further modification of the shearing head.

Figure 24 is a sectional view taken on line 24—24 of Fig. 23.

Figure 24A is an enlarged fragmentary perspective view of an important detail in the construction of the shear bars of the structure illustrated in Figures 23 and 24.

Figure 25 is a sectional view with parts broken off a further modification of shearing head.

Figure 26 is a top plan view, partly broken away, of a modification of a shear plate.

Figure 27 is a fragmentary top plan view of a further modification of shear plate.

Figure 28 is a side elevational view of a modified form of cutter blade.

Figure 1 is a side view with parts broken away of the invention and in which a shearing plate 1 is provided with a plurality of hair receiving slots 2 separated by comb teeth or fingers 4 arcuately extending. Cutter elements 10 and spacing elements 14 are supported by a shaft and held in position thereon by end piece elements 15. The cutter member is movably supported in elongated end bearings 17 by spring elements 16 under tension. In this instance the guide bearings 17 are formed in transverse end walls W secured to opposite marginal longitudinal ends of the shear plate by suitable means, such as soldering or welding; the end walls serving to provide convenient means by which the member can be grasped and removed as a unit, and by which the relative positions of the depending upper portions of the depending side portions may be fixed. Substantially centrally disposed in the cutter assembly are a pair of elongated spacing elements 14a, forming a slot to receive the end of an actuating bar 18 which may be reciprocated electrically by means not shown but well known to reciprocate the cutter elements assembly. The cutter elements 10 are thereby reciprocated across the slots 2, each cutter element operating in the channel formed by the inwardly extending ribs or fins 3 on the back of the fingers or comb teeth 4. In this instance the cutter elements are arranged substantially perpendicular to the longitudinal axis of the shaft. Figure 2 is an end view enlarged along the line 2—2 of Figure 1, and in which the cutter element 10 is shown positioned with the cutting end extending transversely of the head and parallel to the rib or fin 3 and against the inner surface of the plate or comb teeth 4. The shaft 19 is provided with a key 13a to receive the notch 13 (Fig. 3) in the aperture 12 of the cutter element. The shearing plate 1 is backwardly bent as shown to be held to the casing M by a screw S. Preferably, the shear plate is accurately supported on the casing with the longitudinally extending bottoms of the depending side portions of the shear plate resting on the casing and with the longitudinally extending marginal bottom portions of the depending side portions received in longitudinal recesses provided in the casing, the inner walls of the recesses being preferably higher than the outer walls and providing walls against which the inner or rib sides of the depending side portions of the shear plate may rest. The upper end of the casing extending into the hollow of the outer shear member is centrally provided with a longitudinally extending depression which serves to allow the movable inner cutter to be manually lowered if desired, and, also, to provide a surface on which cut hair may accumulate to be shaken or blown out of either end of the shaving head without removing the outer member from its seat on the casing and eliminating the risk of damaging, for example burring, the seating surfaces of either member. If necessary to inspect or replace the parts, the cutter edges may be protected against possible damage by the ribs by gripping the opposite ends of the cutter and lowering it so that its cutting ends are below the ribs, and, upon loosening of the screw or screws, the shear plate may be lifted from the casing. It will be observed in Figures 1, 2 and 3 that the perimeter 11 of the cutter elements and the shearing comb fingers or teeth 4 form a flattened arc in this illustration and in operation the machine does not have to be held at such a precise angle to the face as is necessary when the fingers 4 are in a flat plane. Figure 4 is an enlarged side view of an assembly end showing one of the elongated side walls bearings 17 in which the assembly may be floated by the yieldable elements 16 acting upon the end pieces 15 which are shaped on their sides to prevent rotation. The end elements 15 may be secured to the shaft in any suitable manner, for example, opposite ends of the shaft may be threaded and the end pieces provided with a threaded annular recess and screwed on the shaft; however, as shown here, the ends of the shaft are received in a forced fit in annular recesses in the end elements. Elongated end elements of uniform thickness may be provided to support the end cutter elements 10 and the end spacing elements 14 may be dispensed with. Figure 5 is a sectional perspective view with portions broken away of parts of the invention showing the fingers or comb teeth 4 provided with rearwardly extending ribs or fins 3 projecting beyond the plane of the perimeter 11 of the cutter elements 10. The skin-confronting surface of the shearing plate or comb teeth 4 may be ground down to decrease the thickness of the portion 6 of the finger so as to bring said surface nearer the shearing edge 5 in the slot 2. The ribs or fins 3 are here shown substantially centrally disposed on the rear of the fingers of the shear plate. The joint 7a between the rib and the rear surface of the finger may be curved or angular. The spacing elements 14 are shown of shorter dimension than the cutter elements 10 and short enough to clear the ribs or fins as the cutter assembly is reciprocated across the slots 2. In Fig. 6 the channels 9 formed by the ribs are shown and the dotted lines indicate the extent of travel of the cutter elements 10. In this illustration the joint 8 is shown substantially as a right angle so that the rear surface 7 of the fingers or comb teeth 4 is substantially parallel to the plane of the skin-confronting wall. From Figures 5 and 6 it will be apparent that the wall 6 adjacent the hair-receiving slot or aperture 2 may be initially extremely thin and may be further reduced in thickness by grinding to an edge if desirable and that when the cutter elements 10 are very thin the distance from the rib to the shearing edge 5 may be very short and the shearing edge 5 may be very sharp for considerable length and be supported throughout by the ribs or fins against distortion.

In Figure 7 with parts broken away is illustrated how the invention may be applied to diagonal cutters which may be oscillated in the channels between the ribs 3c of a semi-cylindrical outer shear member 1a. The cutter elements 10b are positioned angularly to the longitudinal axis of the shaft and preferably traverse an arc on a relatively long radius. The cutter elements are shaped as ellipses and mounted oblique to the axes of the slots 2e, in which position they are supported on a shaft by elliptical shaped spacing elements 14'. At some degrees of angle of suspension, and I prefer that the shaft receiving aperture in the cutter element be shaped according to the desired angle of suspension, I may prefer to cut out portions of the ribs or fins 3c. In other instances I may prefer to arrange the angle of suspension and the dimensions of the parts so as to operate the cutter elements within the limits of continuously extending ribs. The cutter assembly may be mounted and oscillated in a number of ways, and Figure 8 is illustrative of how the end pieces 15a may have their inner sides formed on an angle to correspond with the angle at which the cutter elements and spacing elements may be suspended on the shaft 19. End bearings 23 may be provided to hold the assembly which may be rocked thereon or oscillated by a cam or other means travelling in a slot of a bifurcated end 22 carried by a yoke 21 which connects with the end pieces as shown. In Fig. 9 are shown parts in side view in which the cutter elements 10c are provided with cut out portions 10a at their rear in the case of at least one cutter element in which a circumferentially extending cam element 24 carried by a shaft 19a provided with a bearing 23a may be revolved in a wobbly path by a motor in the housing M to oscillate the cutter assembly. The cutter elements 10c may be placed on the shaft 19 at an angle less than a right angle when the slots 2e for receiving hair extend vertically or diagonally. In this illustration the shearing plate 1a is shown as semi-cylindrical in the shearing zone and the perimeters 11d of the cutter elements traverse a path preferably in an arc of a circle, and in some instances the perimeters may be elliptical. The shearing plate may extend backwardly to the housing and be held thereto by screws S as shown.

In Figure 10 with parts broken away, omitted and enlarged an embodiment of the invention is shown in which the cutter is rotary. This view shows upper and lower hair-receiving slot portions 2e' axially aligned spacing parallel shear bars 4b' reinforced by the inwardly or rearwardly extending ribs or fins 3c. In cross-section the shear plate is semi-cylindrical and may be supported in any suitable manner known in the art or in the manner shown in Figure 9. The cutter elements 10d are narrow and are provided with continuous perimeters. The cutters are positioned on the shaft 19 with their perimeter ends in longitudinally spaced and perpendicularly spaced planes, and are obliquely inclined at a high angle to the longitudinal axis of the shaft. The shaft 19 is cylindrical and is longitudinally slotted to hold a key 13a adapted to engage a notch or slot in apertures provided in the bodies of the cutter elements and in spacing elements 14c. The assembly is held together at the predetermined angle by end pieces 15a which in turn may be backed up and held by a nut to engage the threads 20 of the shaft. At the predetermined angle of position the cutter perimeters are parallel to a cylindrical surface and curve circumferentially after the fashion of an ellipse. As shown in this view as the cutters are turned 180 degrees from the position of the full lines they occupy the relative position shown in dotted lines, so that in their rotary travel certain portions of their perimeter edges co-operate with shear edges at opposite sides of the hair-receiving slots. The slots may extend arcuately through any suitable degrees of arc and the slotted hair-receiving zone in the member may extend for any suitable distance longitudinally and transversely. It will be observed that when the cutter elements are to be reciprocated on a slidable shaft and are positioned angularly as shown in this Figure 10 the channels may be enlarged or the cutter elements may be inclined to the shaft nearer to a right angle. In this enlarged view it may be seen that the spacing elements support the thin cutter elements well towards their peripheries or perimeters. It is preferable that the spacing elements terminate sufficiently short of the perimeters in the shearing zone to provide space for the accumulation of hair.

In some instances I may prefer that the cutter elements be bent out of plane to provide a cutter edge. Such an arrangement is shown in Figure 11 in which the cutter elements 10e are shown positioned back to back with spacing elements 14 holding them in position and with the perimeter edges 11e bent out of plane. The perimeter edge may or may not be cut to a very sharp edge and may be bent to any suitable angle and length. On some occasions I may prefer to provide the skin-confronting shearing member with a circumferentially extending slot as shown in Figure 12 in which one or both ends of a slot of uniform width may be enlarged as at 2a and I may prefer so to shape or move the cutter elements as to provide a hair shearing zone only throughout the uniformly wide portion of the slot and use the portions 2a for the purpose of picking up and guiding hairs into the narrower portion to be shorn therein. In some instances the shearing plate may consist of a number of fingers as in Figure 13 which may be positioned to form hair-receiving slots 2. The fingers may be narrower toward their ends as shown to provide diverging ends 2b to the slot 2 for the purpose of picking up and guiding hairs into the slots 2, and I may so arrange the cutter elements as to limit the shearing action to the narrower portion of the slots. The joint or angle between the rib and the shearing edge 5b may be bevelled as shown as at 7a' in Figure 14 or may be an angular joint as shown in Figure 15. In some instances the skin confronting surface 4 of the fingers or comb teeth may be ground to a flat plane as in Figure 14 or may be bevelled or hollow ground as shown and indicated by 4f in Figure 15 to provide a fine edge at 5c. In Figure 16 a shear plate 1 is shown in perspective view with the ends broken off and in which the channels 9 are shown before slots or other hair-receiving apertures have been formed therein. The plate may be rigid or flexible and may be adaptable for use in a flat, curved or irregular plane or in combination thereof. In some instances I may prefer to construct the comb teeth or fingers in rod or bar form as in Figure 17 and provide a pair of bars 26 spaced as shown and provided with notches or slots 3a to receive the ribs or fins 3g of the teeth or comb fingers 4g. A plurality of such rod or bar teeth may be assembled as shown and may be held in position by suitable holding means, as for example, the frame pieces 26a having a longitudinally extending slot 26b. The plane of the skin-confronting face may be flat, curved or irregular or combinations thereof.

In Figure 18 I illustrate a form of the invention in which the shear comb fingers 4h as shown in sectional view may be shaped or ground as at 7a" to a fine edge at 5c' and in which the cutter elements 10f may have their perimeters formed on an arc of a circle and positioned with the central axis directly behind the middle point of the slots 2e', and positioned on a shaft 19 with the cutters angularly inclined to the longitudinal axis of the shaft. The slots 2e' may be just wide enough to admit a hair in some instances and in other instances may be narrow enough dependent upon the shape and length and direction of extension, so that an extremely sharp edge at 5c' will not injure the skin. While the face-confronting surface of the fingers or comb teeth 4h are shown in a cylindrical plane it will be understood that the forward surface of the fingers may be ground or cut on this side similarly to the two curved sides of the teeth or ground in any suitable other fashion to provide a bevelled edge at 5c' on both sides thereof. Such a modification is shown in Figure 18A in which the outer faces of the comb teeth 4m are concave and meet the curved, or concavely ground, inner surfaces 7b at very sharp shearing edges 5e. I prefer to oscillate the cutter elements so that oppositely disposed cutting edges thereon co-operate with shear edges at oppositely disposed sides of the hair-receiving openings in the outer shear member. It will be apparent from the drawings that shearing edges 5a may be shaped to such degree of sharpness as to substantially provide a plurality of shaving edges in the shear plate. In some instances I may not have the cutter elements urged toward the shear plate, or the shear plate urged towards the cutter elements. In some instances there may be little friction between the shearing and cutter members. In some uses the shearing member and cutter members may be in hard contact at the edges during operation and gradually after wear become very slightly spaced with the travel of the cutter elements tending to prevent the sharp edges 5 of the shearing member from turning inwardly. In Figure 19 the assembly of the cutters on the shaft is illustrated with end pieces 15a provided with diagonally cut inner faces conforming to the angle of suspension of the cutter elements 10d and backing up against angularly or diagonally positioned end spacing elements. Of course, the end pieces 15a may be constructed to back up the end cutter elements with the end spacer elements omitted. However, I prefer in some cases and especially when the cutter elements are thin to support the cutter elements on both sides to the same extent; but not necessarily so. It will be understood that the cutter elements and the spacer elements may be formed from flat stock by a stamping operation, as well as in other ways, to virtually any suitable body shape and that the cost of an extra element or two is negligible in a machine of this type and, after assembly preferably, the perimeters 11f may be ground, if desired, to any suitable surface corresponding to the path of operative travel. The shaving head may be secured to the handle housing of the actuating means in numerous ways well known to the art, and in Figure 20 I show an enlarged end view of a shaving head having a frame F resting in channels or recesses or the like of the housing M and held in position thereto by any suitable means such as a screw S. The end pieces 15c of the cutter elements assembly are flattened off for a depth on opposite sides 15b to be received in the bearing walls 17 of a slot in the frame as shown. The cutter is reciprocated longitudinally in the manner and by the means shown in Figures 1 and 2 hitherto described, with the cutting edge carrying ends of the cutter bearing against the inner surface of the plate and with its cutting edges co-operating with the shear edges of the shear blades 4. As shown by the curved dotted lines the end pieces 15c inwardly of the flattened side walls 15b have a circular or cylindrical portion and oppositely disposed flanges which are the result of the flattening of the sides 15b. These flanged portions provide together with the inner wall portions of the frame opposite thereto a means of limiting the longitudinal movement of the cutter. It is believed to be generally well known that in practice cutters longitudinally reciprocated by vibrating bars usually have some "overthrow," and as will be clear on reference to Figure 6, and also to Figure 5, the preferred distance of cutter travel is such that at the end of cutter stroke in either direction there is a space between the ribs of the outer shear plate and each cutter which extends for the length of the cutting-edge end of the latter. These spaces may have any suitable width, but are preferably wider than the diameter of a hair so that cut hair may drop below the ribs and minimize any tendency to accumulate. If desired, reduction or elimination of noise resulting from the contact of the faces of the flanged portions of the end pieces with the confronting wall portions of the frame may be effected by the obvious expedient of facing the confronting surfaces of either or both with suitable material, for example, felt. The cutter element assembly is urged upwardly by forcing elements 16a which may be in the form of suitable yieldable means such as a coil spring or which may be, as shown, in the form of a concavely faced element bearing against convex surfaces of the end pieces, and which element is floated on or carried by forcing means provided in a recess in the portion N of the housing M. By loosening or removing the screw S the shaving head may be lifted or otherwise removed from the housing or handle, and the cutter member assembly may be removed for cleaning or any other purpose. In some instances I may prefer to provide yokelike end bearings such as illustrated in Figure 20A to receive the end pieces of the cutter assembly and hold same to a handle and housing in a suitable manner such as by a screw or bolt.

The invention may be embodied also in forms of longitudinally extending shearing edges 5d, as for example, in Figure 20b in which a plurality of substantially oppositely disposed shearing edges may be spaced by longitudinally extending hair-receiving apertures or slots 2f with the shearing edges provided at the inner surface of longitudinally extending shear bars 4j which bars or portions thereof are supported by the ribs 3j as indicated, and in which the shear plate as a whole is transversely curved at least in the area of the shearing zone. A cutter member may be formed of a plurality of cutting teeth 11b spaced by recessed portions 11a. Each cutter element may have a plurality of such teeth and one cutter element may be spaced, though not necessarily so, from another cutter element by spacing elements 14. It will be apparent that the spacing elements 14 may be omitted and the cutter elements positioned side to side so that the teeth 11b in the same plane may form in effect a continuous longitudinally extending tooth, and, of course, I may provide a cutter in this form, and in some instances may prefer to form these teeth on a single cutter bar. The cutter elements and spacing elements are carried by the shaft 19 which may be moved in a manner and by means similar to those shown in Figure 9 whereby the edges of the cutter teeth are moved into and out of co-operative shearing engagement with the shearing edges 5d, and preferably with the teeth in the same horizontal planes moving transversely in the channels and within spaced limits between the ribs or fins. In Figure 20c is shown a cutter element body 10h in side view and provided with a plurality of teeth 11b and notches 11a in the perimeter or end 11g. Teeth such as these may be provided on cutter elements of any suitable body form.

In Figures 21 and 22 the invention is illustrated as embodied in a shearing plate provided with a pair of longitudinally extending combs having the comb teeth 4j' whose rear or inner edges are shearing edges separated by vertical hair-receiving slots 2h and spaced at their free ends, which may be rounded off as shown, by a longitudinally extending slot 28. This longitudinally extending slot extends through the middle region of the outer shearing member and to within a short distance of the longitudinal ends thereof, and at opposite longitudinal ends of this slot the material of the plate is transversely continuous and conects with the downwardly depending sides as will be clear from the drawings. The cutter elements 10j are preferably cut out as at 29, and the spacing elements may also be cut out as shown, though not necessarily, and the cut out 29 is behind the slot 28 of the shear plate as shown, and may be wider than the slot 28 throughout any part or all of its depth, and may be wide enough to position the edges of the cut out 29, that is the edges of the cutter elements formed by the cut out, wider than the widest points of the slot 28 formed by the ends of the shear teeth 4j or comb teeth. The cutter member may be reciprocated in any suitable manner known to the art, and as shown here is preferably longitudinally reciprocated in oppositely disposed end bearings, a preferred form of which is illustrated by Figure 20A, by the action of a reciprocating bar against the walls of a slot formed by elongated portions 14a of the spacing elements 14 or, as shown in Figure 22, formed by elongated portions 14A' provided on spaced cutter elements 10i. The outer shear plate is positioned on a handle with marginal ends of its oppositely disposed downwardly depending side portions secured in spaced longitudinal slots or grooves by screws, and the inner cutter is urged to bear against the inner surface of the plate by springs and is reciprocated by an electrically actuated bar, all of which will be clear on reference to Figures 1, 2 and 4. The cutter elements and spacers are preferably held on the shaft at the longitudinal ends of the assembly by end piece elements such as has been shown in Figure 20. The longitudinally extending slot 28 may have any suitable width and the cut out 29 of the cutter elements may have any suitable depth, in some instances I may prefer that the open end of the cut out be no wider than the slot 28 ahead of it. It should be noted that the slot 28 can be very narrow, slightly wider than a hair, and the ends of the cutter formed by the cut out can extend close to the free ends of the comb teeth, or that the slot 28 can be relatively wide and the cutter ends formed by the cut out can be spaced by a wider cut out resulting in decreasing the closeness of the cutter end to the outer slot 28 and projecting the comb teeth to well overhang the ends of the cutter teeth so that the skin will not be injured, and at the same time provide the desired closeness of shear-cut. Generally, I prefer to have the slot 28 wide enough to facilitate or considerably facilitate the entrance of hair into the slots 2g and make the width of the cut out recess 29 of the cutter blades wide enough at its upper portion to prevent the cutter from injuring the skin. The ribs or fins 3j' reinforce the comb teeth and extend to the free ends, or approximately thereto, of the comb teeth and in the same direction as the longitudinal axis of the hair-receiving slots 2g. The comb teeth are provided with shear edges laterally of the planes of the ribs, and these edges co-operate with cutting edges on opposite sides of the plate-engaging ends of the cutter to effect shear-cuts as the cutter is reciprocated. As will be noted in the drawings, the free ends of the comb teeth are preferably rounded off widthwise resulting in enlarging or flaring the open end portion of the transverse slots 2g, and as has been hitherto pointed out, the opposite end of the transverse slots may also be enlarged. The plate-engaging ends of the cutter blades are shown as extending beyond the closed ends of the transverse slots and in engagement with the inner surface of the plate. Laterally of the planes of the ribs the comb teeth are very thin preferably, and in their preferred form are bevelled or otherwise sharpened to provide extremely thin or sharp shearing edges as for example as are shown in Figure 15. The free ends of the comb teeth are, as shown, preferably provided with an edge at the end of their outer surface to pick up or deflect hair.

In the modification as illustrated in Figures 23 and 24, I provide a shear plate with oppositely disposed comb or shear teeth 4k and hair-receiving slots 2h. The comb teeth have their outer ends terminating in longitudinally extending hair-receiving slots 28a which are defined on one side by longitudinally extending skin flattening-edges or bars F' provided in the body F of the shearing member. Extending longitudinally in the plate is a groove 29a which provides an opportunity for hairs to project themselves into the slots and to receive rolled skin as the head is manipulated on the skin in alternate directions and especially during the change of direction of movement. As shown in Figure 24 the cutter end is conformed to the cross-sectional shape of the plate and is in engagement with the inner surface of the groove throughout reciprocal movements. A feature included in this construction is that the transversely extending comb teeth or shear teeth 4k project laterally or transversely from a central longitudinally extending bar portion and which bar portion bridges longitudinally to transversely extending marginal end portions which are continuous with oppositely disposed downwardly extending side portions of the outer shearing member. In a preferred embodiment the shear teeth curve upwardly and outwardly in opposite directions providing two spaced rows of alternate shear teeth and hair-receiving slots, and the perpendicular distance from the shear edges of the shear teeth to the plane of the outermost or highest surface of the teeth is preferably uniform, or approximately so, for the length of the shear edges. At their free ends the shear teeth are preferably rounded transversely providing an enlarged or widened entrance portion to the hair-receiving slots 2h, and the outer surface of the teeth preferably meets the rounded ends at an angle intermediate the width of the teeth and provides an edge to travel on the skin and erect or deflect hair for guidance into the shearing portion of the transverse slots. This latter feature is illustrated in detail in Figure 24A in which the outer face or surface 4m of the shear teeth 4k is shown meeting the flat surface of the rounded ends 4n of the shear teeth at a suitable angle such as at a right angle or at an acute angle to provide a skin-engaging, and hair-engaging edge 4m' at the free ends of the teeth. Referring again to Figures 23 and 24: the shear teeth are preferably bevelled or sharpened on their sides as indicated in Figure 15 to provide extremely thin or sharp shear edges, and the transverse slots 2h formed by the teeth or shear bars extend transversely on opposite sides of the longitudinal depression or groove which spaces the respective rows of transverse shear bars or teeth. The shear edges are preferably curved and at the lateral ends of a concave surface on the shear bars or teeth the radius of whose curvature is relatively long, and the high plane or planes of the shear bars on their skin-engaging side are on convexly curved surfaces as shown sloping inwardly and downwardly on opposite sides of the longitudinal groove, and the slope of the opposed rows of shear bars or teeth downwards towards the middle of the shearing head permits the skin to bulge against the shear bars for substantially their entire lengths, and provides an opportunity for hairs which have not entered the leading slots to enter or project themselves into the trailing slots, and this opportunity is further increased by the longitudinal groove in that hairs held against the skin by the backs or outer surfaces of the leading shear bars or teeth are released by the groove into which they can project, thereby increasing the opportunity of the trailing slots to receive them. A further feature is the provision of a skin-flattening bar or wall end extending longitudinally and spaced from the free ends of the shear bars or teeth, and which flattens the skin ahead of the shear edges of the teeth and prevents the skin from entering the transverse slots in a deep ridge at their outer leading ends, and which also prevents the trailing roll or bulge of skin from entering the outer ends of the trailing slots too deeply; also, they protect the skin from injury by the free ends of the shear bars, and minimize the danger that any unusual protuberances on the skin be injured since the skin-flattening bars or wall ends, in the leading direction tend to be lifted by protuberances. A further advantage is that the ends of the teeth have a protection against injury to themselves during the usual or accidental handling of the skin. I prefer that the skin-flattening bars or wall ends have their outer or skin-engaging surface terminate in a plane above the outer ends of the shear edges, and preferably, though not necessarily, terminate in a plane as high as, or approximately as high as the outer surface of the shear bars or teeth at their outer ends. However, the outer ends of the shear bars or teeth, preferably the outer ends of the outer surface, may, with advantage, project slightly above the skin-flattening bars and the width of the hair-receiving slot 28a narrowed accordingly. The skin-flattening walls or bars F' may have any suitable cross-sectional thickness and may be reinforced by ribs as shown in Figure 22, and preferably, though not necessarily, on their slot-confronting side are rounded downwardly so as to tend to glide over hair in the trailing direction, and it will be observed that the relationship of the parts is such that the respective skin-flattening bars or wall ends and the shear bars or teeth can normally simultaneously engage the skin and the co-operating shear and cutting edges preferably do not project or extend above the plane of the upper ends of the oppositely disposed skin-flattening bars or walls, and, also, that the parts are so disposed that the device can be tilted axially with only one skin-flattening bar and one row of shear bars in close engagement with the skin which has advantages in certain areas of the face, and further, that the skin-flattening bars or walls are so shaped and disposed as to preferably intersect the plane of the cutting edges. The shear bars or shear teeth are preferably reinforced by ribs 3k which are received in transverse slots spacing transversely extending curved cutting edges on the cutter, and which slots are wide enough to allow the cutter to be reciprocated with its cutting edges co-operating with the shear edges of the shear bars or teeth. The outer shear member is held to the handle housing by its downwardly depending walls as described and on particular reference to Figures 21 and 22, and the cutter is longitudinally reciprocated in the manner and by the means, and in bearings similar to and within limitations therein, and is urged against the under or inner side of the outer shear member, as has been described and on particular reference to Figures 21 and 22. In the modification shown in Figure 25 the shear plate is provided with a relatively flat portion and elongated slots and shear bars. The shear bars are curved 4a at their forward ends and define here curved slot portions, and are supported for a suitable distance along their lengths by ribs 31 which ribs preferably do not extend into the curved portion 4a of the shear bars. The cutters 10j' are preferably shaped as shown and at their curved ends 10a are laterally supported by spacing elements 14f on each side.

The shearing plate may also be constructed by mounting a substantially mesh-like sheet on a frame of ribs or fins. An illustration in such a form is shown in Figure 26 in which ribs or fins 3b are shown bridged across to frame members 26a somewhat similarly as in Figure 17 and may be held in slots as at 3a in Figure 17, and with the slots closed at the bottom, or otherwise supported. In some instances the ribs or fins 3b may be held spaced from each other by the imposition of spacing elements at or near the ends and the whole clamped or otherwise held together. The ribs may be of uniform or any other suitable width or thickness and be provided with any suitable relative dimensions and may be spaced from each other any suitable distance and be shaped to any suitable plane or planes. In some instances the ribs may be closely grouped and in some instances may be spaced nine or ten one-thousandths of an inch from each other, or less, and in other instances may be spaced more widely than that and in some embodiments of the invention may be spaced considerably wider than one one-hundredth of an inch apart. In instances where I may prefer to use relatively thick or wide-ended perimeters in the cutter member, and, in other instances as well, I may prefer to have the ribs very widely spaced. Generally, however, I prefer to so arrange the parts and the dimensions thereof as to give the maximum area of shearing zone and a maximum amount of shearing edges. The mesh-like shearing plate is preferably constructed with a plurality of very closely grouped hair-receiving apertures 2c divided longitudinally into groups by transversely extending portions 2d of solid and relatively wider widths overhanging and supported by the ribs 3b and may be tightly fitted over the ribs and held in any suitable fashion, or may be held wedged in the slots or recesses 26b of the frame member 26a. The mesh apertures 2c may have any suitable shape, for example, they may be square, rectangular, round, oval, oblong, diamond or other shape. In some instances the mesh-like sheet may be fitted to flat plane ribs or curved plane ribs and in some instances the whole may be bent to provide a firm arcuate surface. In the modification as shown in Figure 27 the hair-receiving openings 2c are less closely grouped than in the preceding figure, and the inner surface of the plate 1e is divided into very narrow channels. The plate herein shown is extremely thin and two opposite parallel sides of the openings are close to the planes of the ribs and extend in parallel planes therewith. It will be understood that in this modification and the modification of Figure 26 that shear edges are provided on the inner surfaces of the plates.

It will be understood that the cutter elements may be provided with any suitable general body shape and contour and that in some instances I may prefer to cut out portions of the body as shown at 12a in Figure 28 in addition to the shaft receiving aperture 12, and that in some instances the cutter elements 10k may be provided with relatively thin portions 11c radially behind the plate engaging surface of the blade ends 11h which thin portions are preferably sharpened on their inner sides providing sharp cutting edges on opposite sides of the transversely flat plate-engaging ends 11h.

From the foregoing it will be observed that the shearing member plate may be made from one piece or assembled from a number of pieces, that it may be rigid or flexible as a whole or in parts; that the face-contacting area and the cutter-confronting area may be formed in a flat or arcuate, or broken plane; that it may be provided with hair-receiving slots or other variety and shape of hair-receiving openings; that it may be adapted to co-operate with cutter members on cutter elements having flat, or arcuate angular or irregular cutter edges and various modifications thereof; that it may be adapted to co-operate with cutter members which may be reciprocated, oscillated, or rotated; and that the shearing member may be employed to co-operate with cutters of numerous shapes, forms and construction as will occur to those skilled in the art. It will further be observed that the invention may be constructed with many variations and changes in the proportions, all falling within the scope of the invention. While I have shown and described certain preferred forms and assemblies of cutter elements and cutter parts and certain co-operative functions thereof, to produce a shearing action, I wish it to be understood that I do not wish to be limited thereto.

Therefore, what I claim is:

1. In a shaving machine, an outer shear plate provided on its inner side with a plurality of cutter receiving channels intermediate the ends of the plate, hair-receiving openings narrower than the channels provided in the bottoms thereof, shear edges at the bottoms of the channels adjacent hair-receiving openings, and a co-operating cutter member movably mounted and provided with spaced cutting blades having their cutting edges disposed in planes transverse to the axis of said cutter member.

2. In a shaving machine, a shear plate reenforced on its inner side intermediate the ends of the plate by a plurality of spaced ribs, shear edges on the inner surface of the plate between the planes of the ribs and extending in planes paralleling the planes of the ribs, and a movably mounted co-operating cutter provided with a plurality of spaced cutting edges.

3. In a shaving machine, a shear plate reenforced on its inner side intermediate the ends of the plate by a plurality of spaced ribs and provided with a plurality of hair-receiving slots in planes lateral of the planes of the ribs, shear edges on the inner surface of the plate adjacent the slots and extending in planes paralleling the planes of the ribs, and a movably mounted co-operating cutter provided with a plurality of spaced cutting edges.

4. In a shaving machine, a shear plate including a row of alternate hair-receiving slots and shear bars provided with shear edges constituting at least portions of the sides of the slots, ribs on the inner side of the plate longitudinally re-enforcing the shear bars, and a movably mounted co-operating cutter provided with a plurality of spaced cutting edges.

5. In a shaving machine, a shear plate re-enforced on its inner side by a plurality of spaced ribs intermediate the ends of the plate, a plurality of hair-receiving slots in the plate in planes laterally of the planes of the ribs, said slots having a uniformly narrow portion terminated at at least one end by an enlarged hair-receiving portion, extremely thin shear edges confronting the narrow portions, and a co-operating cutter including a plurality of spaced cutting edges.

6. A shaving machine including an outer shear plate re-enforced on its inner side by a plurality of spaced walls intermediate the end of the plate, a plurality of hair-receiving openings and shear edges provided in the plate in planes laterally of the planes of the walls and a movably mounted co-operating cutter member provided with a plurality of longitudinally spaced curved cutting edges.

7. A shaving machine including a curved outer shear plate re-enforced on its inner side by a plurality of spaced walls intermediate the ends of the plate, a plurality of hair-receiving openings in the shear plate between said walls providing shearing edges offset laterally from the planes of the walls, a movably mounted co-operating cutter member provided with a plurality of longitudinally spaced cutter blades, double, curved cutting edges on the cutter blades, and means to move said cutting edges into and out of co-operating shearing-engagement with shear edges of the shear plate.

8. A shaving machine including an outer shear plate re-enforced on its inner side by a plurality of spaced walls intermediate the ends of the plate, a plurality of hair-receiving slots in the shear plate between said walls providing shearing edges offset laterally from the planes of the walls, said hair-receiving slots having their longitudinal axes in planes paralleling the planes of said walls, a movably mounted co-operating cutter member provided with a plurality of longitudinally spaced cutter blades, cutting edges on opposite sides of the blades, and means to move said cutting edges into and out of co-operating shearing-engagement with shear edges of the shear plate.

9. A shaving machine including a casing-handle, a shearing head carried on the handle, said shearing head including a curved outer shear plate re-enforced on its inner side by a plurality of spaced walls intermediate the ends of the plate, a plurality of hair-receiving slots in the shear plate between said walls providing shearing edges offset laterally from the planes of the walls, a movably mounted co-operating cutter member provided with a plurality of longitudinally spaced cutter blades, double, curved cutting edges on the cutter blades, and means carried by the casing-handle to move said cutting edges into and out of co-operating shearing-engagement with shear edges of the shear plate.

JOHN T. SCULLY.